United States Patent [19]

Szabat

[11] Patent Number: 4,546,117
[45] Date of Patent: * Oct. 8, 1985

[54] COMBUSTION MODIFIED FLEXIBLE POLYURETHANE FOAM

[75] Inventor: John F. Szabat, Pittsburgh, Pa.

[73] Assignee: Mobay Chemical Corporation, Pittsburgh, Pa.

[*] Notice: The portion of the term of this patent subsequent to Apr. 26, 2000 has been disclaimed.

[21] Appl. No.: 487,652

[22] Filed: Apr. 22, 1983

[51] Int. Cl.$^4$ ............................................. C08G 18/14
[52] U.S. Cl. ..................................................... 521/107
[58] Field of Search ................... 521/107, 137, 92, 123

[56] References Cited

U.S. PATENT DOCUMENTS

| | | | |
|---|---|---|---|
| 3,075,927 | 1/1963 | Lanham | 260/2.5 |
| 3,075,928 | 1/1963 | Lanham | 260/2.5 |
| 3,222,305 | 12/1965 | Lanham | 260/2.5 |
| 3,262,894 | 7/1966 | Green | 260/2.5 |
| 3,448,046 | 6/1969 | Schallin | 252/8.1 |
| 3,574,149 | 4/1971 | Harrington | 260/2.5 |
| 3,635,821 | 1/1972 | Treadwell | 252/8.1 |
| 3,738,953 | 6/1973 | Anorga | 260/2.5 |
| 3,810,851 | 5/1974 | Norman et al. | 260/2.5 |
| 3,817,881 | 6/1974 | Turley | 260/2.5 |
| 3,826,762 | 7/1974 | Treadwell | 260/2.5 |
| 3,897,372 | 7/1975 | Kehr | 260/2.5 |
| 3,909,464 | 9/1975 | Anorga et al. | 260/2.5 |
| 3,943,077 | 3/1976 | Bell et al. | 260/2.5 |
| 4,042,537 | 8/1977 | Dahm et al. | 260/2.5 |
| 4,066,578 | 1/1978 | Murch | 260/2.5 |
| 4,089,835 | 5/1978 | König et al. | 260/31.6 |
| 4,092,752 | 6/1978 | Dougan | 5/345 R |
| 4,266,042 | 5/1981 | Park | 521/123 |
| 4,374,207 | 2/1983 | Stone et al. | 521/107 |
| 4,381,351 | 4/1983 | Szabat | 521/107 |

OTHER PUBLICATIONS

Szabat, Flexible Polyurethane Foam for High Risk Occupancies, 6th Int. Conference on Fire Safety, Menlo Park, California–Jan. 1981.
Alumina Trihydrate As A Flame Retardant for Polyurethane Foams, P. V. Bonsignore, Advances in Urethane Science Technology, 1981–vol. 8, pp. 253–262.
Journal of Cellular Plastics–Jul. 1981, pp. 220–225.
Journal of Cellular Plastics Jan. 1965, pp. 186–199.

*Primary Examiner*—Veronica P. Hoke
*Attorney, Agent, or Firm*—Gene Harsh; Joseph C. Gil

[57] ABSTRACT

The present invention is directed to a combustion modified flexible polyurethane foam produced by reacting:
(A) an organic polyisocyanate,
(B) a polyether polyol selected from the group consisting of
 (i) a polymer polyol, and
 (ii) mixtures of said polymer polyol and a polyoxyalkylene triol having an OH number of from about 25 to about 40,
(C) from about 80 to about 150 parts by weight of hydrated alumina of an average particle size of from about 1.5 to about 5 microns,
(D) from about 4 to about 12 parts by weight of antimony trioxide,
(E) from about 5 to about 30 parts by weight of decabromodiphenyl oxide,
(F) from about 15 to about 30 parts by weight of a halogenated phosphate ester,
(G) from 0 to about 5 parts by weight of a char former,
(H) from about 1.5 to about 3.5 parts by weight of water, and,
(I) from 0 to about 20 parts by weight of an organic blowing agent, said parts by weight of components (C) through (I) being based on 100 parts by weight of component (B), the ratio of components being such that the isocyanate index is from about 105 to about 115.

8 Claims, No Drawings

0
COMBUSTION MODIFIED FLEXIBLE POLYURETHANE FOAM

BACKGROUND OF THE INVENTION

The use of hydrated alumina, alone, or in combination with other additives, to impart fire retardance to flexible polyurethane foams is very well known. See, e.g., U.S. Pat. Nos. 3,262,894, 3,810,851, 3,897,372, 3,909,464, 3,943,077, 4,066,578, 4,092,752 and 4,266,042; "Flexible Polyurethane Foam for High Risk Occupancies", J. F. Szabat et al., presented at the Sixth International Conference on Fire Safety, Menlo Park, California, January, 1981; "Alumina Trihydrate As A Flame Retardant For Polyurethane Foams", P. V. Bonsignore, "Advances in Urethane Science and Technology", 1981, Vol. 8, pages 253–262 (also appearing in THE JOURNAL OF CELLULAR PLASTICS, July, 1981, pages 220-225). In general, the hydrated alumina described has average particle sizes in excess of 9 microns (see, e.g., page 260 of the Bonsignore article).

It is generally known that fire retardant polyurethane foams can be manufactured by using various combinations of compounds containing chlorine, bromine, phosphorus and antimony. Illustratively, U.S. Pat. No. 3,738,953 discloses the use of a combination of antimony oxide, a polyhalogenated compound and a highly chlorinated hydrocarbon polymer as a flame retardant composition for polyurethane foams. The use of antimony oxide in combination with halogenated compounds is well documented in the art (see, e.g., U.S. Pat. Nos. 3,075,927; 3,075,928; 3,222,305 and 3,574,149). Similarly, the use of phosphorus containing compounds in combination with halogenated compounds (see, e.g., U.S. Pat. Nos. 3,365,821; 3,817,881 and 3,826,762) and in combination with halogenated compounds and antimony trioxide (see, e.g., U.S. Pat. No. 3,448,046 and JOURNAL OF CELLULAR PLASTICS, January, 1965, pages 186-199) has been well documented.

Recently, combustion modified flexible polyurethane foams have been developed which are based on the use of hydrated alumina of an average particle size ranging from 8.5 to 20 microns in combination with antimony trioxide, decabromodiphenyl oxide, a halogenated phosphate ester, a char former, water and, optionally, an organic blowing agent. The polyols used were those of the type described in U.S. Pat. Nos. 4,042,537 and 4,089,835. While the resultant combustion modified flexible polyurethane foams exhibit excellent flame properties, the smoke density values (while acceptable for many applications) are higher than desired.

In U.S. application Ser. No. 401,675, filed July 26, 1982, I described a polyurethane foam having improved smoke density values. The invention therein was broadly directed to a combustion modified flexible polyurethane foam produced by reacting an organic polyisocyanate, hydrated alumina (of an average particle size of from about 1.5 to about 5 microns), antimony trioxide, decabromodiphenyl oxide, a halogenated phosphate ester, water and a polyether polyol selected from the group consisting of (i) a dispersion of a polyurea and/or polyhydrazodicarbonamide in a relatively high molecular weight organic compound containing at least two hydroxyl groups, (ii) a polyoxyalkylene triol and (iii) mixtures thereof.

DESCRIPTION OF THE INVENTION

The present invention is directed to the discovery that polymer polyols can be substituted for the polyether polyols of my earlier invention. The resultant foams have improved smoke density values while at the same time have improved ultimate fire retardancy.

More particularly, the present invention is directed to a combustion modified flexible polyurethane foam produced by reacting:

(A) an organic polyisocyanate,
(B) a polyether polyol selected from the group consisting of
  (i) a polymer polyol prepared by polymerizing an ethylenically unsaturated monomer or monomers in a relatively high molecular weight organic compound containing at least two hydroxyl groups, and
  (ii) mixtures of said polymer polyol with a polyoxyalkylene triol having an OH number of from about 25 to about 40,
(C) from about 80 to about 150, and preferably from about 100 to about 140, and most preferably from about 100 to about 120 parts by weight of hydrated alumina of an average particle size of from about 1.5 to about 5 microns,
(D) from about 4 to about 12 parts by weight of antimony trioxide,
(E) from about 5 to about 30 parts by weight of decabromodiphenyl oxide,
(F) from about 15 to about 30 parts by weight of a halogenated phosphate ester,
(G) from 0 to about 5, and preferably from 1 to 2.5 parts by weight of a char former,
(H) from about 1.5 to about 3.5, and preferably about 2 to about 3 parts by weight of water, and
(I) from 0 to about 20 parts by weight of an organic blowing agent, said parts by weight of components (C) through (I) being based on 100 parts by weight of component (B), the ratio of components being such that the isocyanate index is from about 105 to about 115. The resultant foam exhibits excellent foam properties and low smoke values.

Any suitable organic polyisocyanate may be used in practicing the invention such as, for example, aliphatic, cycloaliphatic, araliphatic, aromatic or heterocyclic polyisocyanates including those described, e.g., by W. Siefkin in "Justus Liebigs Annalen der Chemie", 562, pages 75–136, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethylcyclohexane (DAS No. 1,202,785), hexahydrotolylene-2,4- and -2,6-diisocyanate and any mixtures of these isomers, hexahydro-1,3- and/or -1,4-phenylene diisocyanate, perhydro-2,4'- and/or -4,4'-diphenylmethane diisocyanate, phenylene-1,3- and -1,4-diisocyanate, tolylene-2,4- and -2,6-diisocyanate and any mixtures of these isomers, diphenylmethane-2,4'- and/or -4,4'diisocyanate, naphthylene-1,5-diisocyanate, triphenylmethane-4,4',4''-triisocyanate, polyphenyl-polymethylene-polyisocyanates which can be obtained by aniline-formaldehyde condensation followed by phosgenation and which have been described, e.g. in British patent specification Nos. 874,430 and 848,671, perchlorinated aryl polyisocyanates as described, e.g., in German Auslegeschrift No. 1,157,601, polyisocyanates which contain carbodiimide groups as described in German Patent No. 1,092,007, the diisocyanates described in U.S. Pat. No. 3,492,330, polyisocyanates which contain allophanate groups as described, e.g., in British patent specification No. 994,890, Belgian Patent No. 761,626 and published Dutch patent Application No. 7,102,524, polyisocyanates which contain isocyanurate groups as described, e.g., in German Patent Nos. 1,022,789, 1,222,067 and 1,027,394 and in German Offenlegungsschriften No. 1,929,034 and 2,004,048, polyisocyanates which contain urethane groups as desscribed, e.g., in Belgian Patent No. 752,261 or in U.S. Pat. No. 3,394,164, polyisocyanates which contain acylated urea groups in accordance with German Patent No. 1,230,778, polyisocyanates which contain biuret groups as described, e.g., in German Patent No. 1,101,394, in British patent specification No. 889,050 and in French Patent No. 7,017,514, polyisocyanates which are prepared by telomerization reactions as described, e.g., in Belgian Patent No. 723,640, polyisocyanates which contain ester groups as mentioned, e.g., in British patent specification Nos. 956,474 and 1,072,956, in U.S. Pat. No. 3,567,763 and in German Patent No. 1,231,688 and reaction products of the above-mentioned isocyanates with acetals in accordance with German Patent No. 1,072,385.

The distillation residues which are obtained from the commercial production of isocyanates and still contain isocyanate groups may also be used, optionally as solutions in one or more of the above-mentioned polyisocyanates. Any mixtures of the above-mentioned polyisocyanates may also be used.

It is generally preferred to use commercially readily available polyisocyanates such as tolylene-2,4- and -2,6-diisocyanate and any mixtures of these isomers ("TDI"), polyphenyl-polymethylene-polyisocyanates which can be obtained by aniline-formaldehyde condensation followed by phosgenation; and polyisocyanates which contain carbodiimide groups, urethane groups, allophanate groups, isocyanurate groups, urea groups or biuret groups ("modified polyisocyanates"). Presently preferred polyisocyanates are tolylene diisocyanates.

As noted earlier, the polyether polyols useful in the present invention are selected from the group consisting of (i) a polymer polyol prepared by polymerizing one or more ethylenically unsaturated monomers in a relatively high molecular weight organic compound containing at least two hydroxyl groups, and (ii) mixtures of said polymer polyol with a polyoxyalkylene triol having an OH number of from about 25 to about 40.

The polymer polyols (i) useful herein are known and are commercially available. The preparation of such polyols is disclosed in U.S. Reissue Patent 28,715, the disclosure of which is herein incorporated by reference.

The following table lists suitable commercially available Niax polymer polyols from Union Carbide.

TABLE 1

| | Viscosity at 25° C. Centipoises | Apparent Specific Gravity at 20/20° C. | Hydroxyl Number | Polyacrylonitrile. % by Wt | Polystyrene. % by Wt | Molecular Weight Base Polyol |
|---|---|---|---|---|---|---|
| 34–35 | 1267 | 1.027 | 45.0 | 9.9 | 8.1 | 3000 |
| 34–37 | 1563 | 1.037 | 36.8 | 9.0 | 9.0 | 3600 |

TABLE 1-continued

| | Viscosity at 25° C. Centipoises | Apparent Specific Gravity at 20/20° C. | Hydroxyl Number | Polyacrylonitrile. % by Wt | Polystyrene. % by Wt | Molecular Weight Base Polyol |
|---|---|---|---|---|---|---|
| 37–36 | 1771 | 1.057 | 34.8 | 7.2 | 10.8 | 3800 |
| 24–32 | 1211 | 1.036 | 32.0 | 10.0 | 10.0 | 2800 |
| 31–28 | 3000 | 1.050 | 28.0 | 21.0 | — | 5000 |
| 34–28 | 1958 | 1.043 | 28.0 | 11.0 | 10.0 | 5000 |
| 32–10 | 1200 | 1.030 | 32.5 | 4.4 | 4.0 | 5000 |
| 32–33 | 994 | 1.034 | 34.0 | 4.2 | — | 5000 |
| 35–25 | 3000 | 1.056 | 25.6 | 21.6 | 6.4 | 5000 |
| 39–36 | 2900 | 1.057 | 35.5 | 26.1 | 7.4 | 3100 |

The polyoxyalkylene triols useful herein are also known and commercially available. As is recognized in the art, such polyethers are generally prepared by addition of an epoxide, such as ethylene oxide or propylene oxide to an initiator such as trimethylolpropane, glycerin or the like. It is generally preferred to utilize polyoxyalkylene triols with predominantly primary OH groups (generally up to 90% by weight, based on all the OH groups present in the polyether). A particularly preferred family of polyoxyalkylene triols are those produced utilizing glycerin as the initiator, an internal propylene oxide block and having ethylene oxide tipping.

It is presently preferred to use as component (B), a mixture of polymer polyol and triol with a weight ratio of polymer polyol to triol of from 5:95 to 50:50 being preferred, and a weight ratio of from 5:95 to 30:70 being most preferred.

If desired, although not preferred, it is also possible to include minor amounts of difunctional polyethers of the type generally known and used in the art.

Substantially, any hydrated alumina may be used so long as the average particle size is from about 1.5 to about 5 microns, and preferably from about 3 to about 4 microns. Suitable commercially available hydrated aluminas include GHA-732, a hydrated alumina available from Great Lakes Chemical Company and having an average particle size of 3 microns, and 632 ST and 632 SB, hydrated aluminas available from Solem and having average particle sizes of 3 microns. The amount of hydrated alumina may vary from about 80 to about 150 parts by weight based on 100 parts by weight of component (B). The amount of hydrated alumina is preferably from about 100 to about 140 parts and is most preferably from about 100 to about 120 parts.

The halogenated phosphate esters useful herein are also known. They include halogenated diphosphonate esters such as described in U.S. Pat. No. 3,192,242 and halogenated phosphate esters of the type described in U.S. Pat. No. 3,132,169. Specific examples of useful halogenated phosphate esters include: tetrakis-(2-chloroethyl)-ethylene diphosphate; tetrakis-(2-chloroethyl)-2,2-bis-(chloromethyl)-propylene diphosphate; tetrakis-(2-chloroethyl)-diethylether diphosphate; tris-(2,3-dibromopropyl)-phosphate; and the like. Tetrakis-(2-chloroethyl)-ethylene diphosphate and tetrakis-(2-chloroethyl)-2,2-bis-(chloromethyl)-propylene diphosphate are presently preferred.

The formulations of the present invention also may include from 0 to about 5 parts by weight (based on 100 parts of component (B)) of a char former. Any of the char formers generally known in the art may be used. Suitable specific char formers include the poly(ethylene maleic anhydride) copolymers available from Monsanto and Phoscheck P-30, an ammonium polyphosphate having a phosphorus content of about 32%, and available from Monsanto. The presently preferred char former is EMA-1103, a poly(ethylene maleic anhydride) copolymer having a molecular weight of about 8000 and commercially available from Monsanto.

According to the invention, water and, optionally, an organic blowing agent are used. Any suitable readily volatile organic substance may be used as the organic blowing agent. Suitable organic blowing agents include, e.g., acetone, ethyl acetate, halogenated alkanes such as methylene chloride, chloroform, ethylidene chloride, vinylidene chloride, monofluorotrichloromethane, chlorodifluoromethane, dichlorodifluoromethane, butane, hexane, heptane, diethylether and the like. Compounds which decompose at temperatures above room temperature to liberate gases such as nitrogen, e.g., azo compounds such as azoisobutyric acid nitrile, may also act as blowing agents. Other examples of blowing agents and details of methods of using them may be found in Kunststoff-Handbuch, Volume VII, published by Vieweg and Höchtlen, Carl-Hanser-Verlag, Munich, 1966, e.g., on pages 108 and 109, 453–455 and 507–510. The presently preferred blowing agents are methylene chloride and monofluorotrichloromethane.

Conventional catalysts for the urethane reaction are also generally used according to the invention. The catalysts used may be any of those generally known in the art and include, e.g., tertiary amines such as triethylamine, tributylamine, N-methyl-morpholine, N-ethyl-morpholine, N-cocomorpholine, N,N,N',N'-tetramethylethylene diamine, 1,4-diazabicyclo-(2,2,2)-octane, N-methyl-N'-dimethylaminoethyl-piperazine, N,N-dimethylbenzylamine, bis-(N,N-diethylaminoethyl)adipate, N,N-diethylbenzylamine, pentamethyl diethylene triamine, N,N-dimethylcyclohexylamine, N,N,N',N'-tetramethyl-1,3-butane diamine, N,N-dimethyl-β-phenylethylamine, 1,2-dimethylimidazole, 2-methylimidazole or the like. Suitable tertiary amines which contain hydrogen atoms that are reactive with isocyanate groups include, for example, triethanolamine, triisopropanolamine, N-methyl-diethanol-amine, N-ethyl-diethanolamine, N,N-dimethyl-ethanol-amine and their reaction products with alkylene oxides such as propylene oxide and/or ethylene oxide. Silaamines which contain carbon-silicon bonds as described, e.g., in German Patent No. 1,229,290 may also be used as catalysts, e.g., 2,2,4-trimethyl-2-silamorpholine or 1,3-diethylaminomethyl-tetramethyl disiloxane.

Bases which contain nitrogen such as tetraalkyl ammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention and, in particular, organic tin compounds. The organic tin compounds used are preferably tin(II)-salts of carboxylic acids, such as tin(III)-acetate, tin(III)-octoate, tin(II)-ethyl hexoate and tin(II)-laurate and the dialkyltin salts of carboxylic acids, e.g., dibutyltin diacetate, dibutyltin dilaurate, dibutyltin maleate or dioctyltin diacetate.

Other representatives of catalysts which may be used according to the invention and details of the action of these catalysts are described in Kunststoff-Handbuch, Volume VII, published by Vieweg and Höchtlen, Carl-Hanser-Verlag, Munich, 1966, e.g., on pages 96–102.

Any catalytic amount of the catalysts may be used. The amount of catalyst may be between about 0.001% and 10% by weight, based on the weight of component (B).

Surface-active additives (emulsifiers and foam stabilizers) may also be included in the reaction mixture according to the invention. The emulsifiers used may be, e.g., sodium salts of castor oil sulfonates or of fatty acids or salts of fatty acids with amines such as diethylamine oleate or diethanolamine stearate. Alkali metal or ammonium salts of sulfonic acids such as dodecyl benzene sulfonate or dinaphthyl methane disulfonate or of fatty acids such as ricinoleic acid or of polymeric fatty acids may also be used as surface-active additives.

Any suitable foam stabilizer may be used such as, for example, water-soluble polyether siloxanes. These compounds generally have a structure such that a copolymer of ethylene oxide and propylene oxide is attached to a polydimethyl siloxane group. Foam stabilizers of this kind have been described, e.g., in U.S. Pat. No. 3,629,308, the disclosure of which is incorporated herein by reference.

Reaction retarders may also be used according to the invention, e.g., substances which are acid in reaction such as hydrochloric acid or organic acid halides, as may also cell regulators known, per se, such as paraffins or fatty alcohols or dimethyl polysiloxanes and pigments or dyes as well as stabilizers which protect against the effects of ageing and weathering, plasticizers, fungistatic and bacteriostatic substances and fillers such as barium sulfate, kieselguhr, carbon black, hydrated alumina, glass microspheres or whiting.

Other examples of surface-active additives, foam stabilizers, cell regulators, reaction retarders, stabilizers, plasticizers, dyes, fillers and fungistatic and bacteriostatic substances which may be used according to the invention and details of methods of using them and their mode of action are known and have been described in Kunststoff-Handbuch, Volume VII, published by Vieweg and Höchtlen, Carl-Hanser-Verlag, Munich, 1966, e.g., on pages 103–113 and in the aforesaid Saunders and Frisch book.

In general, the overall amounts of materials used is such that the equivalent ratio of diisocyanate groups to hydroxyl groups is from 1.05 to 1.15. In other words, the isocyanate index should be from 105 to 115.

In general, the foams of the present invention are prepared by first blending component (B), component (C) and component (F) in a suitable container which should be equipped with a high shear mixer and a cooling jacket. These components are mixed for a sufficient time until a smooth, consistent blend, free of lumps of component (C) is obtained. Thereafter, components (D), (E) and (G) are added and mixed until no lumps remain in the blend. In general, the temperature of this blend or slurry is from 90° to 120° F. and preferably from 100° to 110° F. Organic blowing agents and any other additives (such as catalyst, surfactant and the like) are then optionally added and blended into the slurry. If water must be separately added (e.g., since sufficient water would not be present in the blended materials already), it is preferably added at the foam mixing station. The resultant blend (or B-side) is then processed in accordance with the known one-shot foaming technique using, e.g., Hennecke high or low pressure foam equipment.

Details concerning foam processing apparatus which may also be used according to the invention are given in Kunststoff-Handbuch, Volume VI, published by Vieweg and Höchtlen, Carl-Hanser-Verlag, Munich, 1966, e.g., on pages 121–205.

The foams of the present invention can be made at densities of 3 to 8 pounds per cubic foot and are superior to the commercially available conventional polyurethane foams in terms of fire retardancy because they form a strong char when exposed to a flame and do not develop any flammable drippings, thus protecting the foam underneath against burning. Not only does the foam of the invention comply with the small open flame tests such as DOC-FF-1-70 Methenamine Tablet, MVSS #302, ASTM 1692, California Bulletin 117, FAR 25.853, but it also exhibits good resistance to ignition and burning under the Radiant Panel (ASTM D-3675) and California Bulletin 121 tests. Particularly dramatic improvements are seen when samples of foams of the present invention are compared to prior art foams when tested according to ASTM E-662-79, Standard Test Method for Specific Optical Density of Smoke Generated by Solid Materials.

The foams produced according to the instant invention find use in many areas including mattresses, packaging, crash pads, cushions, seating, carpet underlays and the like.

The invention is further illustrated but is not intended to be limited by the following Examples in which all parts and percentages are by weight unless otherwise specified.

DESCRIPTION OF FLAME/FIRE TESTS USED IN EXAMPLES

Radiant Panel Test (ASTM D-3675)

The Radiant Panel Test (ASTM D-3675) employs a radiant heat source (~650° C.) consisting of a 12 in.×18 in. panel in front of which a 6 in.×18 in. specimen is mounted and burned. It was developed to study the burning characteristics of surface coatings and later adopted for measuring the fire resistance of foams and other plastics. The flame spread index, $I_s$, of a sample is calculated as the product of the flame spread factor, $F_s$, and the heat evolution factor, Q, thus:

$$I_s = F_s Q$$

where:

$$F_s = (1 + 1/t_3 + 1/t_6 - t/3 + 1/t_9 - t/6 + 1/t_{12} - t_9 + 1/t_{15} - t_{12})$$

here: $t_3 \ldots t_{15}$ correspond to the times in munites from specimen exposure until the arrival of the flame front at a position of 3 . . . 15 inches, along the specimen.

$$Q = 0.1 \Delta T/B$$

where: 0.1 is a constant, arbitrarily chosen to yield a flame spread index of approximately 100 for red oak, $\Delta T$ is the observed maximum stack thermocouple temperature rise in degrees in Fahrenheit over that observed with an asbestos cement board specimen, and B is the maximum stack thermocouple temperature rise per unit heat input rate to the calibration burner, degrees Fahrenheit per Btu per minute. The tests set forth in the instant application were based on a 1″ thick sample as indicated. As is apparent, the lower the $I_s$, the more flame resistant the foam.

ASTM D-622-79 - SMOKE

According to ASTM D-622-79, a 1″×3″×3″ specimen is placed in a closed chamber. A gas flame is then impinged on the specimen for 10 minutes. The concentration of smoke evolution is determined by light attenuation and recorded in terms of optical smoke density. In general, the optical smoke density is measured 90 seconds and 4 minutes after ignition, with a maximum smoke density also being recorded.

RAW MATERIALS USED IN EXAMPLES

POLYOL A: A glycerin initiated propylene oxide/ethylene oxide polyether having an OH number of 28.

POLYOL B: was Niax 34-28 (see Table 1).

ISO: The isocyanate used was an 80/20 mixture of 2,4- and 2,6-toluene diisocyanate.

T101: Tetrakis-(2-chloroethyl)-ethylene diphosphate.

ATO: Antimony trioxide.

FR-300BA: Decabromodiphenyl oxide - regular grind, average particle size 18 microns.

EMA-1103: Poly(ethylene maleic anhydride) copolymer, molecular weight of about 8000, available from Monsanto.

DEQA-LF: Diethanolamine containing 15% by weight water.

DABCO 33LV: A 33% solution of triethylene diamine in dipropylene glycol.

NIAX A-1: Bis(2-dimethylaminoethyl)-ether, available from Union Carbide.

T-12: Dibutyltin dilaurate.

L-5307: A silicone surfactant available from Union Carbide.

R-11: Monofluorotrichloromethane.

632 SB: Hydrated alumina, average particle size 3 microns available from Solem Industries, Inc.

General Foaming Procedure

In the examples which follow, POLYOLS A and B and T101 were first charged to a mix tank, heated to 105° F. and stirred with a high shear mixer. The hydrated alumina was then slowly added with stirring. Stirring was continued until a smooth consistency was obtained. The FR-300BA was added slowly, again with stirring. Stirring was continued until a smooth consistency was obtained. The ATO and EMA-1103 were each separately added in the same manner. The resultant slurry was then transferred to the resin tank of a UBT-65 foam machine. The components were then metered to the mixhead of the foam machine as seven different streams as follows:

Stream 1: POLYOL A and B, T101, hydrated alumina, FR-300BA, ATO and EMA-1103
Stream 2: ISO
Stream 3: Water, DEOA-LF
Stream 4: DABCO 33LV and NIAX A-1
Stream 5: T-12
Stream 6: L-5307
Stream 7: R-11

The resultant foam buns were in each case 40″×20″×10′.

EXAMPLES 1 THROUGH 3

The materials used and results obtained were as indicated in Tables 2, 3 and 4.

TABLE 2

| Formulation | FORMULATIONS | | |
|---|---|---|---|
| | Ex. 1 | Ex. 2 | Ex. 3 |
| POLYOL A | 95 | 95 | 70 |
| POLYOL B | 5 | 5 | 30 |

TABLE 2-continued

| FORMULATIONS | | | |
|---|---|---|---|
| Formulation | Ex. 1 | Ex. 2 | Ex. 3 |
| ISO | 33.6 | 33.6 | 33.6 |
| 632 SB | 120 | 120 | 120 |
| T101 | 30 | 30 | 30 |
| FR-300BA | 22 | 22 | 22 |
| ATO | 8 | 8 | 8 |
| EMA-1103 | 2.5 | 2.5 | 2.5 |
| WATER | 2.1 | 2.1 | 2.1 |
| DEOA-LF | 1.2 | 1.2 | 1.2 |
| DABCO 33LV | 0.8 | 0.8 | 1.13 |
| NIAX A-1 | 0.05 | 0.05 | 0.07 |
| T-12 | 0.1 | 0.1 | 0.2 |
| L-5307 | 1.0 | 1.5 | 1.5 |
| R-11 | 7.0 | 7.0 | 7.0 |
| WATER (total) | 2.6 | 2.6 | 2.6 |
| R-11 (total) | 7.0 | 7.0 | 7.0 |
| INDEX | (105) | (105) | (105) |

TABLE 3

| PHYSICAL PROPERTIES | | | |
|---|---|---|---|
|  | Ex. 1 | Ex. 2 | Ex. 3 |
| Density, pcf | 4.2 | 4.1 | 4.2 |
| Tensile strength, psi | 10.8 | 10.4 | 9.8 |
| Elongation, % | 145 | 143 | 119 |
| 22 hr/50% compression set, % | 10 | 10 | 14 |
| IFD (4"), lbs/50 in² | | | |
| @ 25% R deflection | 26 | 26 | 30 |
| @ 65% R deflection | 72 | 72 | 87 |
| Sag ratio | 2.8 | 2.8 | 2.9 |

TABLE 4

| COMBUSTIBILITY DATA | | | | | | |
|---|---|---|---|---|---|---|
|  | Ex. 1 | | Ex. 2 | | Ex. 3 | |
|  | a | b | a | b | a | b |
| (1) ASTM D-3675 Radiant Panel, 1" Thick Specimen | | | | | | |
| Surface burning, in. | 12 | 12 | 12 | 12 | 9 | 9 |
| ΔT, °F. | 159 | 144 | 184 | 132 | 137 | 130 |
| Fs | 13.4 | 10.9 | 10.7 | 16.1 | 8.2 | 7.6 |
| Q | 16.2 | 14.7 | 19.3 | 13.4 | 13.9 | 13.3 |
| Is | 217 | 160 | 206 | 215 | 114 | 101 |
| (2) ASTM E-662-79, Flaming Mode, 1" Thick Specimen | | | | | | |
| Ds 90 secs. | 50 | | 44 | | 83 | |
| Ds 4 min. | 173 | | 213 | | 368 | |
| Dm | 217 | | 248 | | 397 | |
| Time to Dm, min. | 6.7 | | 6.0 | | 4.9 | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A combustion modified flexible polyurethane foam produced by reacting:
   (A) an organic polyisocyanate,
   (B) a polyether polyol selected from the group consisting of
      (i) a polymer polyol prepared by polymerizing an ethylenically unsaturated monomer or monomers in a relatively high molecular weight organic compound containing at least two hydroxyl groups, and
      (ii) mixtures of said polymer polyol and a polyoxyalkylene triol having an OH number of from about 25 to about 40,
   (C) from about 80 to about 150 parts by weight of hydrated alumina of an average particle size of from about 1.5 to about 5 microns,
   (D) from about 4 to about 12 parts by weight of antimony trioxide,
   (E) from about 5 to about 30 parts by weight of decabromodiphenyl oxide,
   (F) from about 15 to about 30 parts by weight of a halogenated phosphate ester,
   (G) from 0 to about 5 parts by weight of a char former,
   (H) from about 1.5 to about 3.5 parts by weight of water, and
   (I) from 0 to about 20 parts by weight of an organic blowing agent,
said parts by weight of components (C) through (I) being based on 100 parts by weight of component (B), the ratio of components being such that the isocyanate index is from about 105 to about 115.

2. The foam of Claim 1 wherein component (C) is used in an amount of from about 100 to about 140 parts by weight, component (G) is used in an amount of from about 1 to 2.5 parts by weight, and component (H) is used in an amount of from about 2 to about 3 parts by weight.

3. The foam of claim 2 wherein component (C) is used in an amount of from about 100 to about 120 parts by weight.

4. The foam of claim 1 wherein the polyisocyanate is a tolylene diisocyanate.

5. The foam of claim 1 wherein component (B) is a mixture of a polymer polyol and a polyoxyalkylene triol based on glycerin and having a propylene oxide internal block and ethylene oxide tipping.

6. The foam of claim 5 wherein the average particle size of component (C) is from about 3 to about 4 microns.

7. The foam of claim 6, wherein component (F) is tetrakis-(2-chloroethyl)-ethylene diphosphate.

8. The foam of claim 6 wherein component (D) is tetrakis-(2-chloroethyl)-2-bis-(chloromethyl)-propylene diphosphate.

* * * * *